Patented Dec. 19, 1944

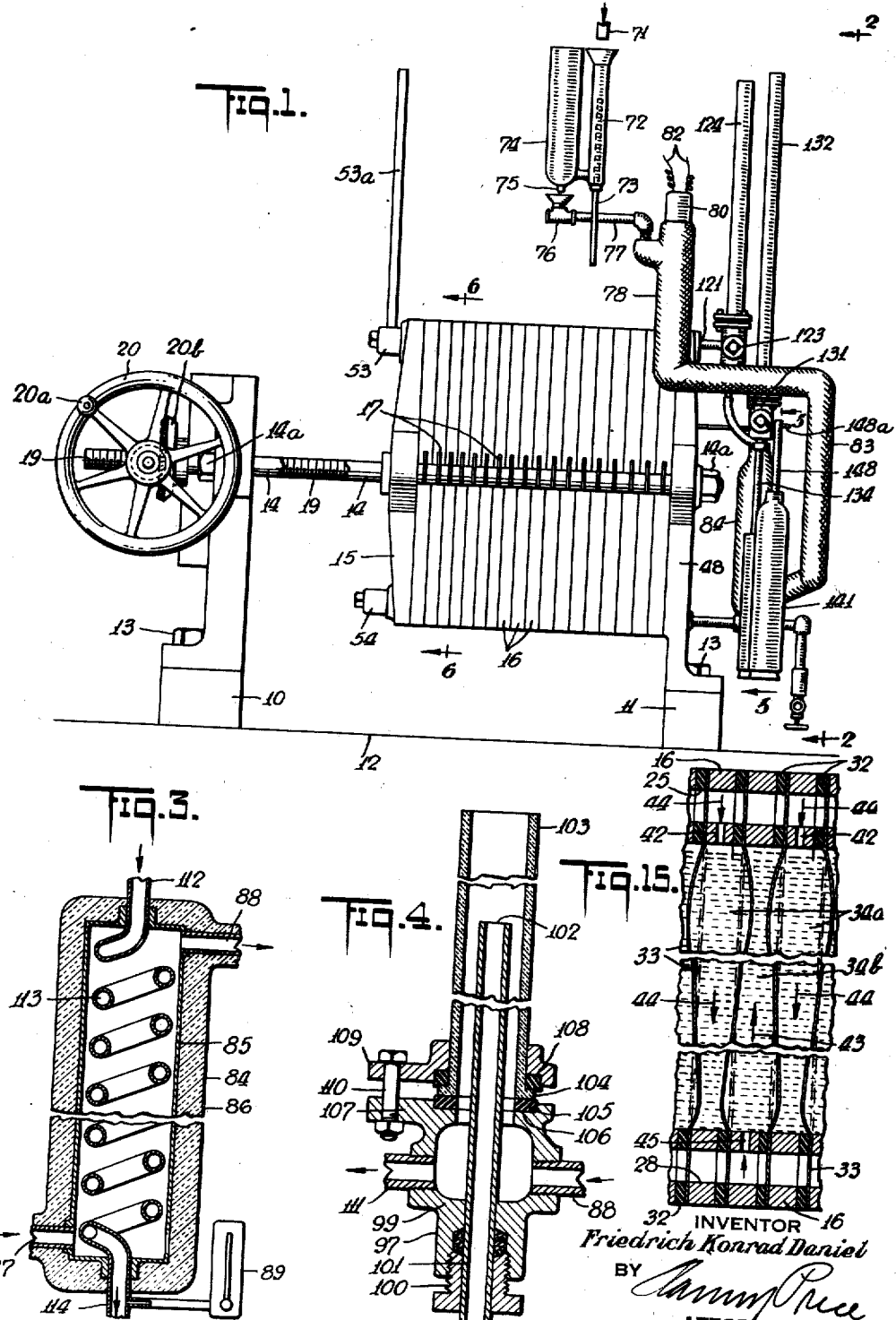

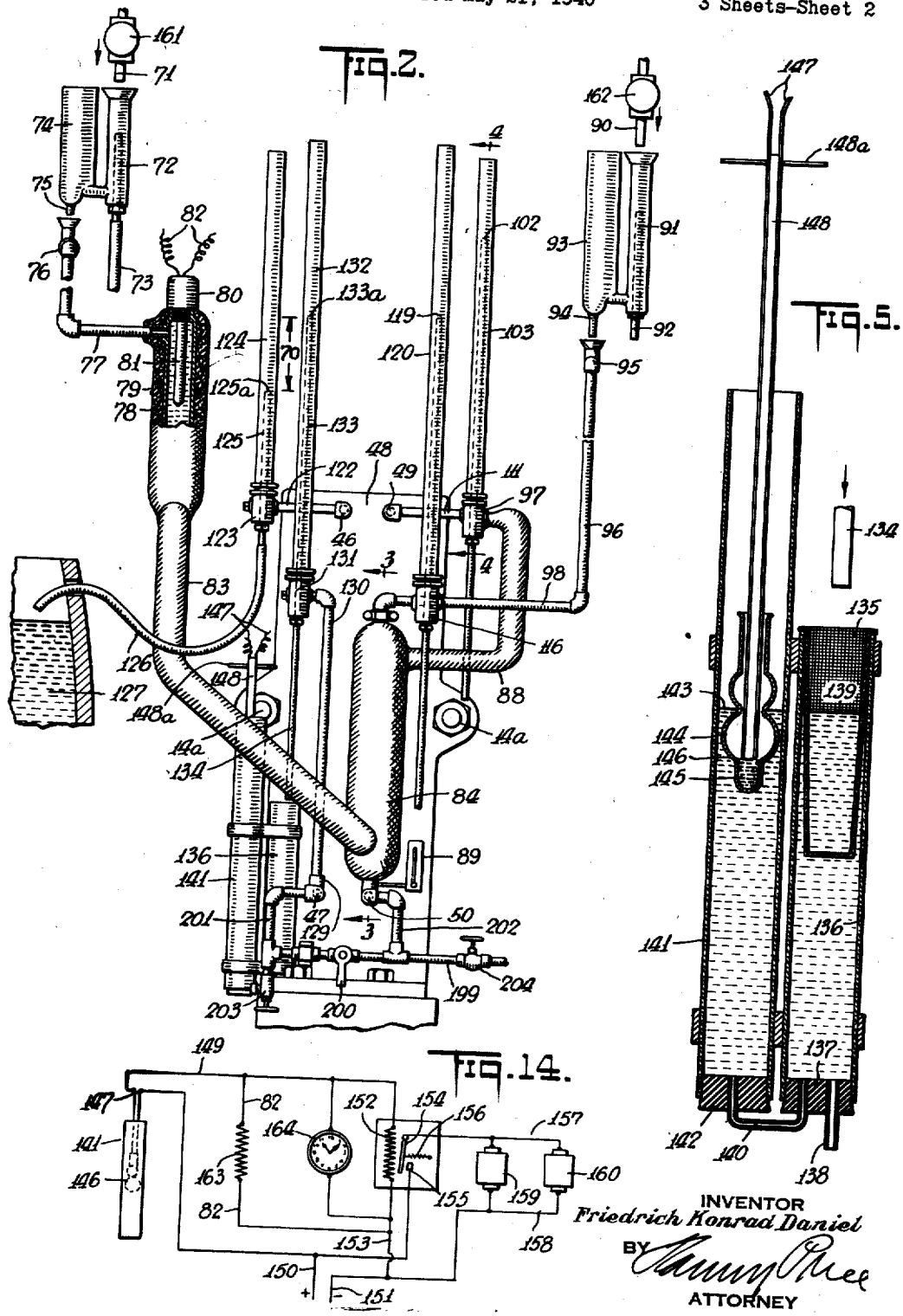

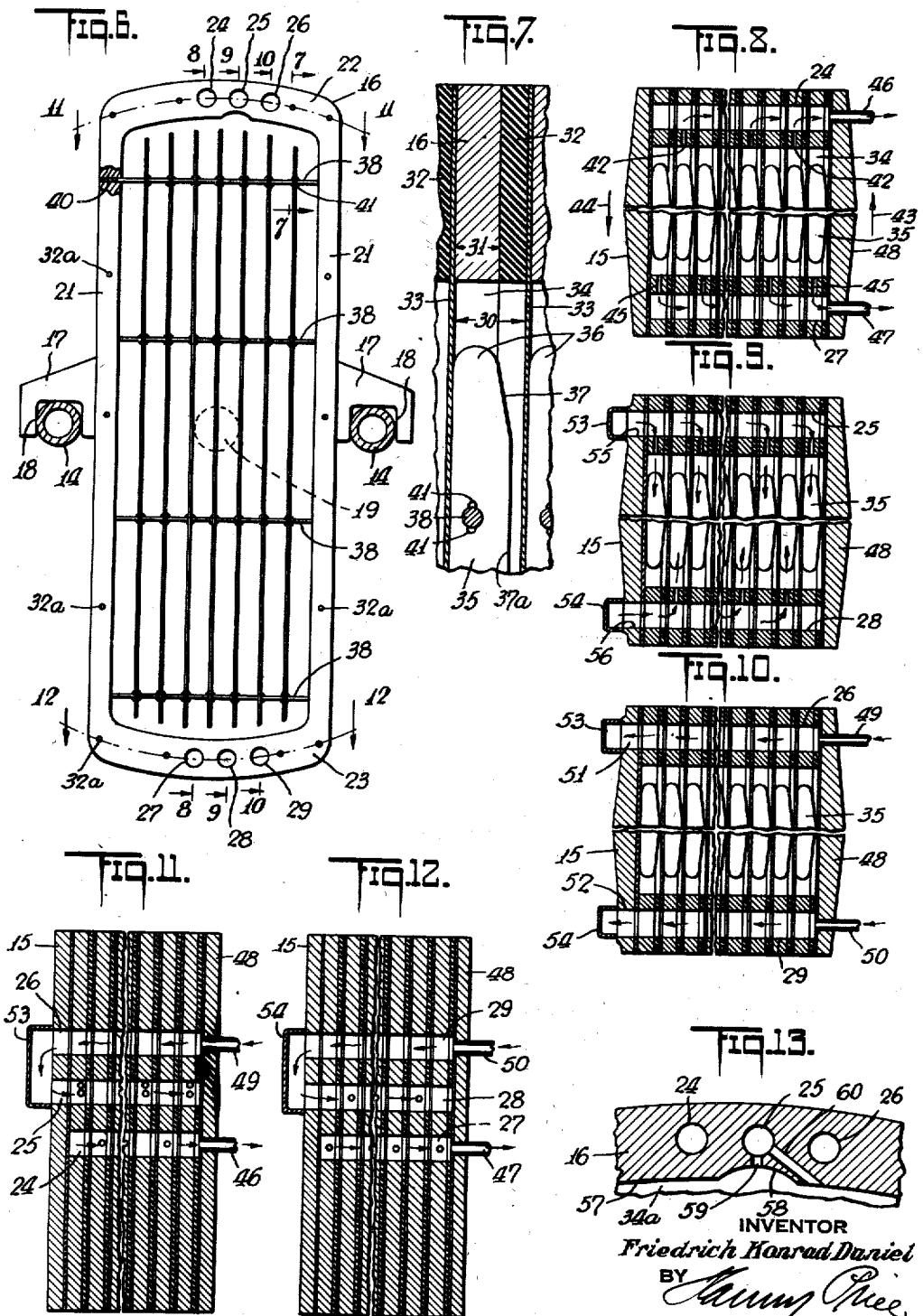

2,365,457

UNITED STATES PATENT OFFICE 2,365,457

DIALYSIS

Friedrich Konrad Daniel, Kew Gardens, N. Y., assignor to Hornkem Corporation, New York, N. Y., a corporation of New York Application May 21, 1940, Serial No. 336,332

7 Claims. (Cl. 210—8.5)

The present invention relates to dialysis and it particularly relates to improvements in dialysis apparatus and procedures.

Dialysis has been applied to certain limited extent in commercial fields, as for example in the viscose industry for the recovery of caustic soda from the hemicellulose, in the treatment of latex, in the sugar industry for the recovery of crystallizing sugars from molasses, and generally in separating relatively low molecular weight crystalloids from relatively high molecular weight colloids when in aqueous solution, but the procedures and apparatus which have been employed have not attained the best possible economy and efficiency.

In spite of the inherent simplicity of the dialysis process, its application is still very limited.

Among the factors which have limited the application of dialyzing procedures has been the difficulty of maintaining a sufficiently thin diaphragm effective over prolonged periods of time without breakage and without frequent replacement.

The rate of transfer of the low molecular substances from the liquid being dialyzed to the dialyzing liquid or water in the solution depends, among other things, on the nature of the membrane and on its thickness. The thinner it is, the more efficient the process. However, there is a practical limit to the fineness in that the average life of the membrane becomes shorter with decreasing thickness. A point exists where gains from the high rate of dialysis are overbalanced by the loss of time incurred by the frequent replacement of membranes.

The tendency toward breakage or decreased life of the diaphragm is increased with dialysis at elevated temperatures and/or if the liquid on the one side of the membrane has a much higher specific gravity than the liquid on the other side. This latter causes bulging of the membrane to one side. The membrane has to take up and counter-balance the excess weight of the liquor over the solution on the other side.

The strain tending to break the diaphragm is greatly increased where an excess hydrostatic head or pressure is used upon the cells which contain the liquor of higher specific gravity, which procedure for example may be employed for reducing the degree of dilution of the fluid of higher specific gravity.

It is among the objects of the present invention, therefore, to provide an improved dialysis procedure and apparatus which will reduce the strain upon the diaphragms to enable increased life and less frequent replacement of such diaphragms and which will permit more economical and efficient operation of the dialyzing procedure.

In accomplishing this object, it has been found most satisfactory to decrease the strain upon the membranes and to increase the life of the membranes by regulating the hydrostatic head on the water cells in such a way that the distention, bagging or bulging of the membranes is kept to a minimum.

It has not been found sufficient merely to maintain a higher head or pressure upon the less dense liquid and a lower head or pressure upon the more dense liquid as, for example, where the former is water while the latter is a relatively concentrated solution to be dialyzed, and it has been found important to achieve a co-relation between the differential head of pressure and the configuration of the diaphragm being employed.

The best condition is attained when the diaphragms have a slightly curved sinuous shape, with the membrane bulging toward the water side in the lower part of the compartment and bulging toward the liquor compartment in the upper part of the apparatus.

This is based upon the assumption that the liquor to be dialyzed is the heavier liquid. But in a reverse case, the pressures or heads have to be reversed to keep strain on membrane at a minimum. The middle part of the membrane will be kept fairly straight and the strain over the whole membrane may thus be kept at a minimum.

This effect may be readily obtained by providing a relatively decreased head in the liquor compartments in which the heavy liquor is caused to enter at the bottom and flow upwardly. In the water compartments in which the water is caused to flow downwardly, the water may be caused to have a higher head in the water cells than the liquor in the liquor cells.

As the dialysis proceeds, the solutes from the liquor being dialyzed pass across the membrane into the water and water in turn passes back into the liquor. As a result, the specific gravity of the liquor will be reduced as it rises in the liquor cells so that at the upper end of the cell the dialyzed liquor will not be much heavier than the water. Hence in the upper part of the cells the higher pressure on the water presses the membranes towards the liquor cells, while in the lower part as a result of the higher gravity of the liquor, the membranes are pressed towards the water cells.

It has been found desirable to have the dialysis procedure continue and the apparatus function without need of constant supervision and with assurance at the same time that in case of breakage of a membrane or diaphragm, the apparatus will be automatically shut off and the process will be discontinued until such breakage is repaired, and it is an object of the present invention to provide an improved dialyzing procedure and apparatus, which will require a minimum of attention and supervision and which permit the apparatus to be automatically cut off or taken out of operation as soon as there is a break in one or more of the diaphragms or membranes and kept out of operation until such break in such membrane or membranes has been repaired.

The above described difference in head between the liquor and water compartments may be used to accomplish this object, and this difference in head may be used to actuate directly or indirectly a cut-off or safety apparatus in case of a break in the membrane which will tend to decrease or eliminate such difference in head.

If any membrane in the dialyzer breaks, the liquid with the higher hydrostatic head or other pressure (for example, the water), will flow into those cells on which the lesser hydrostatic or other pressure rests, (for example, the liquor being dialyzed).

This will result in the effluent from the water cells taking place from the liquor cells instead of from the water cells, and this decrease or stoppage of flow through the normal outlet of the water cells may serve as a control for automatically shutting off the dialyzer whenever a failure in the membrane and thus in the dialyzing operation occurs.

Various types of devices may be utilized to accomplish this result. The water flowing from the liquor or water cells may be connected to various types of flow meters or orifices or weir arrangements, which either upon decrease in level or decrease in flow from the water compartment or increase in level or increase in flow from the liquor compartment through mechanical or electric means will cut off the liquor and water flow to the apparatus.

In one convenient method of control, a float may be suspended in a chamber connected to another chamber receiving the effluent from the water cell, and when there is a substantial decrease in such level, this float may be caused to actuate a signal and/or an electrical circuit to close solenoid control valves on the liquor and water inflow lines.

Generally, it is desired to regulate these control devices so that they have delayed action, either by using dash-pot arrangements, delayed action relays or other delay mechanisms so that the actual cut-off will not take place until a substantial time or as long as 4 to 5 minutes after the water outflow decreases or stops.

Another difficulty which has been experienced in dialysis apparatus resides in the fact that the frames that must be made and utilized are quite expensive and the apparatus is not simple enough and efficient enough to assure a continuous, uniform and economical dialysis process, and it is among the further objects of the present invention to provide an improved economical and simple frame construction which will lend itself more readily to economical dialyzing procedures.

In accomplishing these objects, it has been found that one of the primary difficulties resides in the fact that some or all of the dialyzing cells in a dialyzing apparatus are often thrown out of operation because of the formation of air pockets, particularly in the upper part of the water cells or at the top of the water frames around the openings or port holes through which the water enters the frame, and it is among the objects of the present invention to provide an improved frame construction which will permit such air to be readily bled or removed from the chamber so as not to upset or cause variation in the effectiveness of the dialyzing apparatus and the various cells thereof.

In accomplishing these last mentioned objects, it has been found satisfactory to bulge or dome the tops of the dialysis cells and to arrange alternative passageways, preferably of different length and at different levels, which will permit the air to flow out of the water compartments or cells while the water is flowing into the cells. In this manner, it is possible to eliminate a flow blockage in any water cell because of the presence of air which would cause the water to take preferential paths through the other water cells.

In aiding this removal of air from the cells, it is not desirable to provide grids or supports for the membranes which extend all the way to the tops and bottoms of the frames, since this would result in forming a plurality of air collecting pockets at the tops of the frame. It has been found desirable to terminate the grids short of the upper and lower ends of the frame to avoid formation of such pockets.

A still further improvement in the construction of the dialyzing frame particularly to be used with corrosive liquids, resides in constructing them of synthetic-resin-impregnated laminated materials instead of in stainless steel or other highly priced metals, which latter not only involve great weight and expense, but also considerable welding or soldering.

Preferably, the cell elements or structures are formed of laminated canvas, paper, or asbestos, which is desirably impregnated with plastic materials resistant to water and acids. Phenol formaldehyde resins, for example, have been found to resist the attack of acid liquors even at elevated temperatures of 40 to 70° C.

This laminated material not only has great mechanical strength, but lends itself readily to cutting, drilling, tapping and other types of mechanical operation.

It has also been found desirable to heat both the water, as well as the liquor, to an elevated temperature, say for example 30 to 70° C. before being passed into the cells, and desirably this may be accomplished by heating one of the liquors and then causing it to flow as a jacket or in countercurrent heat exchange relationship around the conduit for the other liquor, so that it is possible to regulate the temperature of both the liquor and the water.

Referring to the drawings, which show one of the embodiments according to the present invention, but to which the invention is by no means restricted, since the drawings are merely by way of illustration and not limitation, Fig. 1 is a side elevational view of an apparatus which may be utilized to carry out the dialysis procedure of the present invention;

Fig. 2 is an end elevational view of the apparatus of Fig. 1 taken from the line 2—2 of Fig. 1;

Fig. 3 is a transverse sectional view of the countercurrent heat interchanger upon the line 3—3 of Fig. 2, upon an enlarged scale as compared to Fig. 2, Fig. 3 being somewhat shortened by breaking away the middle portion thereof;

Fig. 4 is a transverse sectional view upon the line 4—4 of an overflow control of Fig. 2, Fig. 4 being somewhat shortened by breaking away the middle portion thereof;

Fig. 5 is a transverse sectional view of the float shut-off control upon the line 5—5 of Fig. 1, upon an enlarged scale as compared to Fig. 1;

Fig. 6 is a transverse sectional view showing a cell frame upon the line 6—6 of Fig. 1, upon an enlarged scale as compared to Fig. 1;

Fig. 7 is a transverse sectional view upon the line 7—7 of the upper part of the frame structure of Fig. 6, upon an enlarged scale as compared to Fig. 6;

Figs. 8 to 12 are respectively transverse sectional views of the grouped cell frame structures upon the lines 8—8, 9—9, 10—10, 11—11 and 12—12 of Fig. 6;

Fig. 13 is a sectional view of the upper portion of the frame, as shown in Fig. 6, upon an enlarged scale as compared to Fig. 6;

Fig. 14 is a diagrammatic wiring arrangement of the electrical controls of the present invention; and Fig. 15 is a diagrammatic cross sectional view showing the disposition of the membranes when they are loaded to reduce the strain thereon.

Referring to Fig. 1, the dialysis apparatus is provided with the end stands 10 and 11, which are supported upon the floor 12 by the bolts 13. Between the end stands 10 and 11 extend the parallel rods or tubes 14 having the end nuts 14a (see also Fig. 6).

The dialysis apparatus is provided with the end plate 15 and the intermediate frames 16. Each of the frames 16 is provided with the outstanding ears 17 (see particularly Fig. 6) having the recesses 18 to engage and fit upon said tubes 14.

The upright 10 preferably carries the screw member 19, which may be actuated by the hand wheel 20 having the handle 20a through bevel gears 20b to move the end plate 15 to compress the stack of frames 16 against the upright 11.

The plate 15 may be removed and the number of frames 16 may be varied in accordance with the number of chambers it is desired to obtain in the dialysis apparatus.

The cell structure is best shown in Figs. 6 to 13. Each of the cells may be formed by an approximately rectangular frame 16 having the straight sides 21 and the convex upper portion 22 and convex lower portion 23.

Each of the frames 16 is preferably formed of a number of compressed sheets of resin or synthetic plastic varnish or lacquer impregnated asbestos, paper, fabric, canvas, or cardboard, which is highly resistant to chemicals of various kinds and which enables more ready shaping and forming of the frame 16 to perform the desired function in connection with the dialysis apparatus.

The top and bottom of each of the frames, as indicated at 22 and 23, are of somewhat greater depth and they receive passageways for the dialyzing liquor, such as water, and for the liquor which is to be dialyzed against the water.

In the arrangement shown in Fig. 6, the passageway 24 may serve as the outlet for the liquid to be dialyzed, the passageway 25 may serve for distributing the water to the various cells formed by the frames 16, while the passageway 26 may serve for the water inlet passageway.

At the lower part of the frame 16, the passageway 27 may serve as the water outlet, the passageway 28 to feed the liquor to be dialyzed to each of the cells and the passageway 29 to conduct the liquor across the length of the structure.

These passageways 24, 25, 26, 27, 28 and 29 may be bored in the laminated structure 22 and 23 constituting the upper and lower parts of the frame 16. All controls for these passageways are preferably provided at one end of the apparatus, namely, at the stand 11.

Referring to Fig. 7, it will be noted that each of the cells has a width 30, which is greater than the width 31 of the frame 16, with the rubber gaskets 32 taking up the additional space and being compressed through the hand wheel 20 and the screw 19 of Fig. 1. The rubber gaskets 32 are held in place by the attachments 32a in Fig. 6.

Compressed between the gaskets 32 and the frame 16 are the membranes or diaphragms 33, which may be a permeable material, such as regenerated sheet cellulose, parchment or other sheet materials, which will generally permit the passage of crystalloids, but prevent passage of colloids.

Extending vertically of the cells 34 between the diaphragms 33 are the fin-like supports 35 having the upper and lower rounded portions 36 and the oblique sides 37 adjacent the upper and lower portions of the cells 34. The edges 37a preferably terminate short of the adjacent membranes 33 as shown in Fig. 7 and also short of the upper and lower ends of the frames 16.

These fins 36 are held apart by the rods 38, which at their ends 40 are fed into the sides 21 of the frames 16 in a liquid-tight fashion.

The rods are preferably provided with the deformed portions 41 to fix the fins or spacer plates 35 in position.

As shown in Fig. 8, the liquor outlet connection 24 is provided with an opening 42 to each second cell 34, in which the liquor to be dialyzed flows upwardly, as indicated by the arrow 43.

The intervening series are used for the downward passage of the dialyzing liquid or water, which flows in the direction indicated by the arrow 44 and passes into the passageway 27, which communicates through the passageways 45 with every alternate cell 34.

The liquor from the passageway 24 and the water from the passageway 27 finally flow out through the tubes 46 and 47 respectively, which pass through the plate 48 on the upright 11.

In Fig. 10 is shown the passageways 26 and 29 which receive the incoming water through the tube 49 and the incoming liquor to be dialyzed through the tube 50. Said tubes 49 and 50 extend through the plate element 48.

The water and liquor respectively flow through the entire group of cells to the passageways 51 and 52 in the end plate or clamping plate 15, where they pass through the conduits 53 and 54 to the respective passageways 55 and 56 in the end plate 15, as best shown in Figs. 9, 11 and 12. The passageway 53 is provided with a vent 53a, as shown in Fig. 1.

The passageways 55 and 56 respectively communicate with the passageways 25 and 28. The passageways 25 and 28 supply water and liquor to alternate cells, as best shown in Figs. 9 and 11 to 13.

Referring to Fig. 13, the domed space 57 at the top of the frame 16 will tend to collect the air passing into or arising out of the water cells 34a (Fig. 15), which air will tend to collect in the recess 58 in the top of the frame and flow out through the short vertical passageway 59 into the passageway 25, which is of sufficient diameter as to permit the flow of water around the air.

At the same time the water may flow down through the inclined bore 60 into the upper part of the alternate water cells 34a. As a result, there will be obtained a syphon action or circulating action with the air flowing up through the bore 59 and with the water flowing down through the bore 60, assuring that the cells will be promptly emptied of any collection of air at the top thereof and at the same time will be maintained in operation without air blocking.

With the alternate liquor cells 34b (see Fig. 15), since the liquor tends to flow upwardly, this flow will tend to force the air out through the ports 42, as shown in Fig. 8, and it is not necessary to provide special connections as indicated in Fig. 13 for such alternate liquor cells.

By forming the frame 16 of laminated resin impregnated materials, whether of canvas or paper, it is possible to avoid the necessity of using stainless steel and at the same time welding and soldering may be avoided.

Moreover, the structure is much lighter with the laminated frame 16 and such laminated frames not only have great mechanical strength, but lend themselves readily to cutting, drilling, tapping and other forming operations, while at the same time they resist deterioration and attack of acid liquors, even at elevated temperatures, such as 30 to 55° C., as may be used in the dialysis procedure.

In Fig. 15 is diagrammatically indicated upon a somewhat exaggerated scale the manner of maintaining the diaphragms balanced and with a minimum of strain by using an increased head or pressure on the water or liquid having the less specific gravity.

For example, the cells 34a may be the water cells or the cells receiving the liquor of less specific gravity, which flows downwardly in the manner indicated by the arrows 44, while the cells 34b may receive the liquor of higher specific gravity, which flows upwardly, as indicated by the arrow 43. The normal vertical portion of the membranes 33 is indicated by the dot and dash lines.

In the arrangement shown in Fig. 15, it will be noted that at the middle of the height of the compartments 34, the diaphragms 33 will be in approximately normal position, while below the middle portion, they will tend to bulge into the water compartments 34a, while above the middle they will tend to bulge into the liquor compartments 34b.

To accomplish this, a difference in head or pressure indicated diagrammatically at 70 in Fig. 2 may be provided, with the result that the strain on the diaphragms or membranes will be reduced as compared to the strain or stress thereon, if the head were maintained equal on both liquids or liquors, with the result that the diaphragm would excessively bulge all in one direction into the cell or toward the cell having the liquid of less specific gravity.

In the preferred procedure according to the present invention, this difference in head is also utilized to control the safety mechanism which shuts off the flow in case of breakage of a diaphragm and the operation may be more fully understood by reference to the arrangement shown in Figs. 1 to 5 and 14.

Referring to Figs. 1 and 2, the water passes inwardly through the tubing 71 into the tubular chamber 72 having an overflow 73.

From the receptacle or chamber 74, the water will drip at 75 into the receiver 76, where it will flow through the pipes 77 into the heating chamber 78.

The heat chamber 78 is provided with an insulating casing 79 and it has a cap 80 with the depending resistance heating element 81 having a coil 163 (see Fig. 14) projecting downwardly within the chamber 78. The heater is provided with electrical energy through the wiring 82.

From the chamber 78 the water, which may be heated to 40 to 55° C. will flow through the insulated pipe 83 to the heat interchanger 84, which is shown in cross section in Fig. 3.

Referring to Fig. 3, the heat interchanger 84 is provided with a vertical chamber 85 and an insulating casing 86 into which the water flows at 87 and out of which the water flows at 88. The temperature measuring device 89 indicates the temperature of the liquor flowing out of the heat interchanger 84.

From the insulated pipe 88 the water passes into the connection 97 of the air venting and overflow device, the detailed structure of which is best shown in Fig. 4.

As indicated in Fig. 4, the water flows inwardly through the pipe 88 into the junction 99. The lower portion of the junction has a stuffing box connection at 100 to a vertical tube 101, which projects upwardly through the connection 97 to a predetermined height, as indicated at 102 within the tube 103.

The tube 103 has a flange at its lower end 104 where it rests upon the gasket 105 fitted into the groove 106 in the top flange 107 of the junction 97.

Above the flange 104 is the gasket 108, which is pressed down by the flange 109 and the bolt 110 forming a liquid-tight connection. The liquor then will flow outwardly through the connection 111.

In case of any blockage, the water will fill up to the top 102 of the overflow tube 101. The water from the tube 111 will then flow into the inlet 49.

The liquor, in the meantime, has flowed in through the inlet tube 90 (see Fig. 2) into the receptacle 91, which has an overflow 92. Then it passes into a chamber 93 from which it drips at 94 into the receiver 95 and flows down through the pipes 96 and 98.

Then it will pass through the venting and overflow device 116 having the outer tube 120 and the inner tube 119 of the same construction as shown in Fig. 4.

Then the liquor passes into the inlet 112 of the heat exchange device 84 down through the coil 113, out through the outlet 114, and then at 50 into the bank of dialysis cells 34.

The liquor will flow out through the connection 46 into the pipe 122, the junction 123 of the level control 124 having the overflow pipe 125 and then through the tubing 126 into the receptacle 127, where the finally dialyzed liquor will be received and then used in the manner desired.

On the other hand, the water will flow out from the dialysis cells at 47 into the junction 129 up through the pipe 130 into the junction 131, which connects with the level control device 132 having the overflow pipe 133, the upper end 133a of which again, as will be noted, is higher than the upper end 125a of the liquor overflow pipe 125.

The water from the device 132 will overflow into the pipe 134 into the level safety device, which is best shown in Fig. 5.

The upper ends 125a and 133a of the overflow pipes 125 and 133 will regulate the pressure head on liquor and water flowing through the bank of cells 34 and it will be noted that this difference in head is indicated at 70.

The water from the pipe 134 will flow first into the strainer 135 (see Fig. 5), which is contained in the vertical cylindrical vessel 136 plugged at its lower end 137 and having the small diameter outlet pipe 138, which maintains a desired level at 139 in said chamber 136.

The chamber 136 is provided with a narrow tube connection at 140 to the chamber 141 through the stoppers 137 and 142, so that the same level, as indicated at 143, will be maintained in the chamber 141, as at 139 in the chamber 136.

In the chamber 143 there is maintained the float 144 having a mercury pool 145, which will normally close a contact at 146 across the wires at 147, which are parallel to each other and extend downwardly in the glass tube 148.

If, due to breakage in the diaphragm or membrane, the water instead of flowing out through the device 132 and into the vessel 136, will tend to flow into the liquor cells and into the device 124 and the dialyzed liquor receptacle 127, the level of water in the chambers 136 and 141 will tend to fall.

Due to the narrow passageway through the tubing connection 140, there will be some lag before the level of water in the chamber 141 falls to the same degree as in the chamber 136. When the bar 148a strikes the top of the vessel 141 as the float 144 approaches the bottom of the chamber 141, the wires 147 will be lifted out of the pool of mercury 145 and the circuit between the wires 147 will be opened. The device will then be shut off in the manner more fully indicated in Fig. 14.

It is to be understood, of course, that the element shown in Fig. 5 is merely illustrative and other types of weirs, flow controls, orifices, flow meters and so forth, might be employed.

Referring to Fig. 14, there is indicated the float control chamber 141, the contact 146 and the wires 147, which form part of the circuit 149.

The circuit 149 is supplied from the feed wires 150 and 151. The circuit extends from the supply 150 across the wires 147 and the contact 146, the line 149 to the relay coil 152 and through the conduit 153 back to the other supply wire 151.

This relay coil 152 will normally maintain the armature 154 out of contact with the relay contact 155.

Upon breakage of the circuit at 146, the spring 156 will move the armature 154 back against the contact 155 setting up a circuit through the wires 157 and 158 and the solenoids 159 and 160. These solenoids will operate valves upon the water inlet line and the liquor inlet line, as diagrammatically indicated at 161 and 162 in Fig. 2.

A the same time, the opening of the circuit at 146 will shut off the heating coil 163, which operates the heating device 80 and the electric clock 164, which has a recorder to record the time at which the apparatus has been cut off. An alarm may be positioned in or associated with the clock consisting of a light and/or bell to call the attendant.

When it is desired to empty the cells 34 of the liquid therein, this may be done by opening the valves 200 and 203, whereupon all water and liquor will flow out through the connections 47 and 50, the pipes 201 and 202 and past the opened valves 200 and 203 to waste.

Where it is desired to fill the cells 34, the valves 200 and 204 are opened with the valve 203 remaining shut.

Water will then flow past the valve 204, the pipes 199, 201 and 202 into the cells through the connections 47 and 50 until they have all been filled with water and an overflow takes place through the pipes 125 and 133.

Then the valves 200 and 205 are closed and the apparatus is permitted to function in the manner above described.

Although the apparatus, as shown, may be made of widely varying dimensions, it has been found satisfactory according to one embodiment of the invention to make the frame 16 about 11 inches wide and about 32¼ inches deep.

The various passageways 24 to 29 may be made about ¾ of an inch in diameter, while the fins 35 may be made $\frac{3}{32}$ of an inch thick, ½ inch deep and they may be spaced apart an inch to 1⅛ inches.

Although the apparatus is shown as collecting only the liquor effluent from the cells 34b into the container 127, the waste water flowing through the pipe 138 of Fig. 5 may also be collected and utilized.

The apparatus as shown and described may be operated over long periods of time without danger, and needs only a check up for example once every 2 to 4 days.

If a break in a membrane 33 occurs during the night, the apparatus will remain out of operation until it can be repaired in the morning.

By use of the heat exchanger 84, it is possible to cause the temperature of the liquor to be dialyzed to bear a fixed relationship to the directly heated liquid or dialyzing water.

In cases where the heat exchanger 84 has a sufficiently long coil, it is possible to obtain equal temperatures in both liquids, or in some instances the liquid to be dialyzed may actually be elevated to a higher temperature than that of the water about to pass into the dialysis compartments or cells. In cases of a short coil or a straight pipe, liquor may have a somewhat lower temperature than the directly heated water.

The indirect heating is advantageous not only in saving power and enabling ready regulation, but also in that the colloidal mixture present in most liquors to be dialyzed very often is quite heat sensitive and local overheating is avoided as would not be possible with an instantaneous heater.

The lower part of the frames 16 may be straight but are preferably domed to permit the liquor of the higher specific gravity to pass up through the inlet 45 at the lowest point of the cells 34b and assure better flow without formation of pockets at the lower corners of the frames.

The danger of channelling, which is present when the grids 35 extend all the way to the top and bottom of the cells is also largely overcome with the construction as shown in Figs. 6 and 7.

As many changes could be made in the foregoing processes, and many apparently widely different embodiments of this invention could be made without departing from the scope thereof, it is intended that all matter contained in the above description shall be interpreted as illustrative and not in a limiting sense.

What is claimed is:

1. In a dialysis apparatus, a framework including cell skeleton members, a rubber gasket against one face, and a semi-permeable membrane against the other face of each skeleton member, said members being arranged in cyclic sequence to form a series of cells, means to pass liquor to be dialyzed and the dialyzing liquid through alternate cells, said frames being formed of laminated, synthetic, insoluble, infusible resin impregnated fibrous sheet material.

2. In a dialysis apparatus, a framework including cell skeleton members, membranes stretched over said skeleton members forming the cells and separating the cells from each other, means to pass liquors to be dialyzed and water through alternate cells, said cells being provided with domed upper portions and separate passageways connected to such domed portions of the water cells to enable the air to escape while water is flowing into the upper portions of said cells, the passageways for air having openings into said cells at a higher level than the passageways for water.

3. In a process of dialyzing concentrated aqueous liquors containing a mixture of high and low molecular weight compounds distributed therein, flowing said liquor across one side of a thin semi-permeable membrane and flowing water across the other side thereof, whereby the low molecular weight compounds pass through said membrane from the liquor into the water and heating at least one of said flowing liquids before said passage to a temperature of about between 90° to 160° F. and then causing said heated liquid to heat the other liquid by flowing in heat exchange relationship therewith before entering the dialyzer.

4. A method of dialysis, which comprises flowing water and a liquor of higher specific gravity to be dialyzed across a thin permeable membrane and heating one of said fluids separately while flowing, and then heating the other fluid by heat exchange relationship with the first heated fluid before said fluids are caused to flow across opposite sides of said membrane.

5. A method of dialysis which comprises flowing water and a liquor to be dialyzed across opposite sides of a permeable membrane and heating the water to an elevated temperature by countercurrent flow thereof in heat exchange relationship and passing the same with the liquor before flowing the liquor and the water across the membrane.

6. In a dialysis apparatus, a framework including cell skeleton members, membranes stretched over said skeleton members forming the cells and separating the cells from each other, means to feed liquor to be dialyzed through a set of alternate cells and the dialyzing liquid through the set of intervening alternate cells, inlet valves therefor, outflow means for the liquor and for the dialyzing liquid, solenoids for controlling said inlet valves, means to maintain a greater head on one set of alternate cells than on the other set, a receptacle fed from said outflow means, a reservoir having a restricted connection with said receptacle, solenoid circuit control means responding to the level of liquid in said reservoir, said reservoir being arranged relative to said receptacle for slow flow from the reservoir through the restricted connection to the receptacle when the outflow of the dialyzing liquid is stopped, thereby to effect closure of said inlet valves in response to and following a predetermined interval of many seconds after the rate of flow changes consequent upon rupture of a membrane.

7. In apparatus of the character described, water cells, intervening liquor cells, inlet valves therefor, a pair of vessels into which the water cells discharge, a narrow flow connection between the lower ends of said vessels, a restricted outlet in one of the vessels, a hollow float with a pool of mercury in the other vessel, solenoids for closing off the inlet valves, a circuit closed by said float when the latter is carried at a given minimum level by the liquid discharged from the water cells into the first vessel, said circuit including a pair of upstanding electrical conductors and a relay in said circuit controlling said solenoids.

FRIEDRICH KONRAD DANIEL.

---

CERTIFICATE OF CORRECTION.

Patent No. 2,365,457.  December 19, 1944.

FRIEDRICH KONRAD DANIEL.

It is hereby certified that error appears in the printed specification of the above numbered patent requiring correction as follows: Page 6, second column, line 5, strike out "and passing the same" and insert the same after the word "temperature" in line 3, same page and column, and that the said Letters Patent should be read with this correction therein that the same may conform to the record of the case in the Patent Office.

Signed and sealed this 20th day of March, A. D. 1945.

Leslie Frazer (Seal)  Acting Commissioner of Patents.

What is claimed is:

1. In a dialysis apparatus, a framework including cell skeleton members, a rubber gasket against one face, and a semi-permeable membrane against the other face of each skeleton member, said members being arranged in cyclic sequence to form a series of cells, means to pass liquor to be dialyzed and the dialyzing liquid through alternate cells, said frames being formed of laminated, synthetic, insoluble, infusible resin impregnated fibrous sheet material.

2. In a dialysis apparatus, a framework including cell skeleton members, membranes stretched over said skeleton members forming the cells and separating the cells from each other, means to pass liquors to be dialyzed and water through alternate cells, said cells being provided with domed upper portions and separate passageways connected to such domed portions of the water cells to enable the air to escape while water is flowing into the upper portions of said cells, the passageways for air having openings into said cells at a higher level than the passageways for water.

3. In a process of dialyzing concentrated aqueous liquors containing a mixture of high and low molecular weight compounds distributed therein, flowing said liquor across one side of a thin semi-permeable membrane and flowing water across the other side thereof, whereby the low molecular weight compounds pass through said membrane from the liquor into the water and heating at least one of said flowing liquids before said passage to a temperature of about between 90° to 160° F. and then causing said heated liquid to heat the other liquid by flowing in heat exchange relationship therewith before entering the dialyzer.

4. A method of dialysis, which comprises flowing water and a liquor of higher specific gravity to be dialyzed across a thin permeable membrane and heating one of said fluids separately while flowing, and then heating the other fluid by heat exchange relationship with the first heated fluid before said fluids are caused to flow across opposite sides of said membrane.

5. A method of dialysis which comprises flowing water and a liquor to be dialyzed across opposite sides of a permeable membrane and heating the water to an elevated temperature by countercurrent flow thereof in heat exchange relationship and passing the same with the liquor before flowing the liquor and the water across the membrane.

6. In a dialysis apparatus, a framework including cell skeleton members, membranes stretched over said skeleton members forming the cells and separating the cells from each other, means to feed liquor to be dialyzed through a set of alternate cells and the dialyzing liquid through the set of intervening alternate cells, inlet valves therefor, outflow means for the liquor and for the dialyzing liquid, solenoids for controlling said inlet valves, means to maintain a greater head on one set of alternate cells than on the other set, a receptacle fed from said outflow means, a reservoir having a restricted connection with said receptacle, solenoid circuit control means responding to the level of liquid in said reservoir, said reservoir being arranged relative to said receptacle for slow flow from the reservoir through the restricted connection to the receptacle when the outflow of the dialyzing liquid is stopped, thereby to effect closure of said inlet valves in response to and following a predetermined interval of many seconds after the rate of flow changes consequent upon rupture of a membrane.

7. In apparatus of the character described, water cells, intervening liquor cells, inlet valves therefor, a pair of vessels into which the water cells discharge, a narrow flow connection between the lower ends of said vessels, a restricted outlet in one of the vessels, a hollow float with a pool of mercury in the other vessel, solenoids for closing off the inlet valves, a circuit closed by said float when the latter is carried at a given minimum level by the liquid discharged from the water cells into the first vessel, said circuit including a pair of upstanding electrical conductors and a relay in said circuit controlling said solenoids.

FRIEDRICH KONRAD DANIEL.

---

CERTIFICATE OF CORRECTION.

Patent No. 2,365,457.     December 19, 1944.

FRIEDRICH KONRAD DANIEL.

It is hereby certified that error appears in the printed specification of the above numbered patent requiring correction as follows: Page 6, second column, line 5, strike out "and passing the same" and insert the same after the word "temperature" in line 3, same page and column, and that the said Letters Patent should be read with this correction therein that the same may conform to the record of the case in the Patent Office.

Signed and sealed this 20th day of March, A. D. 1945.

Leslie Frazer (Seal)     Acting Commissioner of Patents.